Patented Mar. 1, 1927.

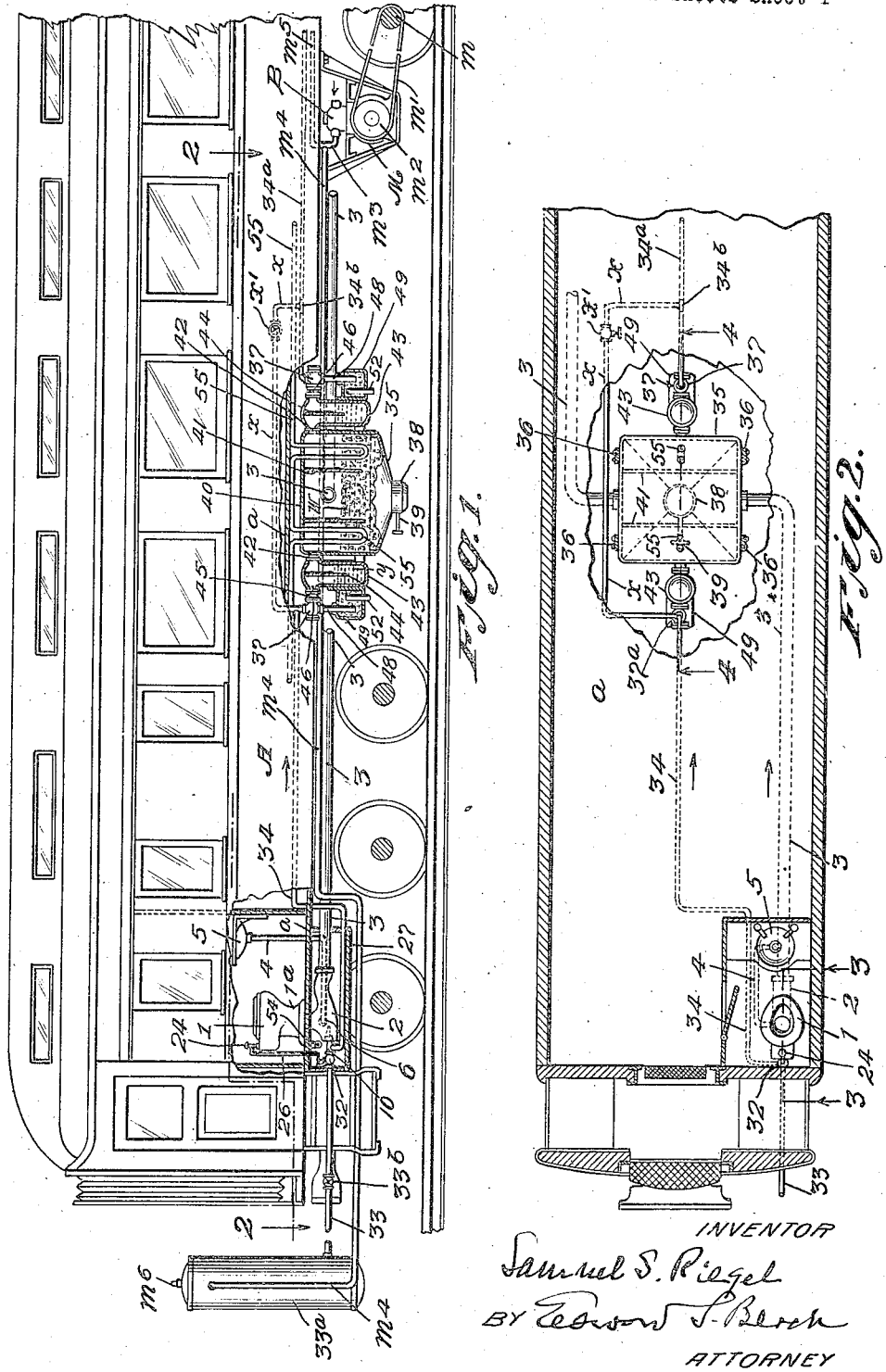

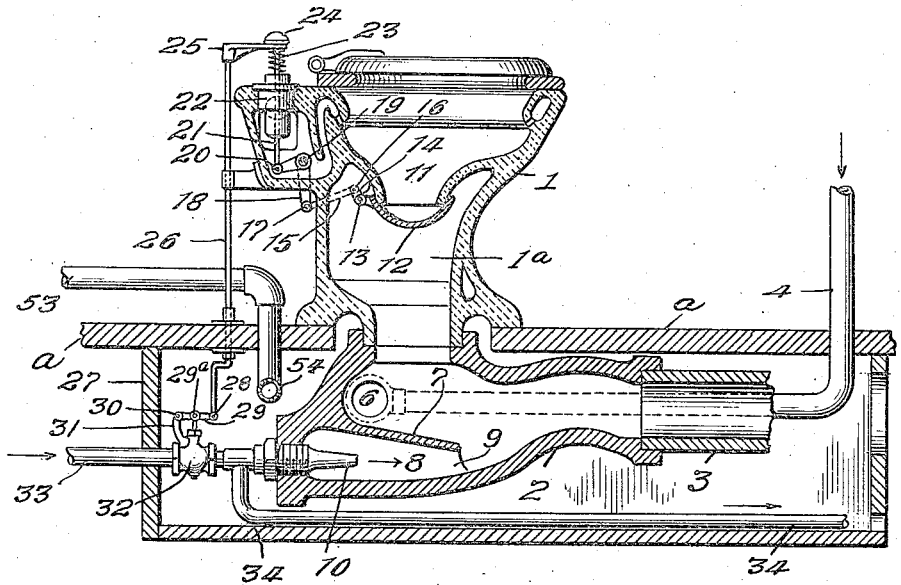
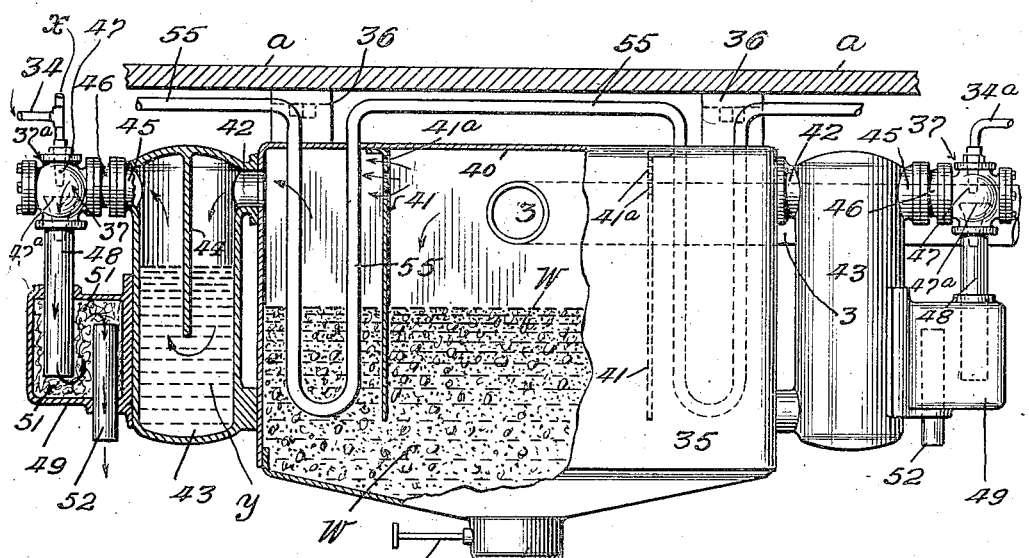
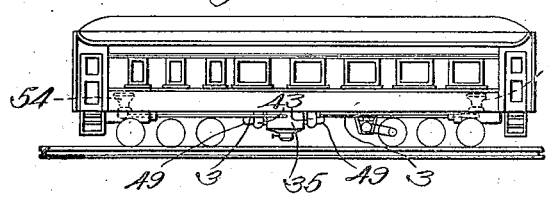

1,619,369

UNITED STATES PATENT OFFICE.

SAMUEL S. RIEGEL, OF SCRANTON, PENNSYLVANIA, ASSIGNOR, BY MESNE ASSIGNMENTS, OF ONE-HALF TO JOHN H. ALLEN, OF JERSEY CITY, NEW JERSEY.

PASSENGER-CAR-WASTE-TRANSFER APPARATUS.

Application filed April 28, 1925. Serial No. 26,441.

This invention relates to a passenger car waste transfer apparatus. The object of the invention is to transfer waste from passenger car water closets and wash basins to a temporary storage container which can be discharged at convenient times and places. The mode of operation of the herein described apparatus is embraced in the transfer method set forth in my application Serial No. 26,440, filed April 28, 1925, filed contemporaneously herewith relating to railway vehicle ash and other waste transfer method and apparatus.

In the accompanying drawings forming a part hereof and illustrating the present invention:

Fig. 1 is a side elevation of a part of a passenger car, portions being broken away to show the water closet, wash basin and temporary storage container, the latter being indicated in partial section.

Fig. 2 is a transverse section at line 2—2 of Fig. 1, of the body of the car, the floor of which is broken away, and shows the water closet, wash basin and conduit connections with the temporary storage apparatus, shown in top plan view.

Fig. 3 is a vertical section through the water closet structure at a line corresponding with line 3—3 of Fig. 2; and Fig. 4 is a partial sectional elevation of the temporary storage apparatus at line 4—4 of Fig. 2.

Fig. 5 is a diagrammatic view to indicate toilet apparatus at each end of the car.

In the drawings, A indicates one end portion of the car body carrying dependently from the floor a temporary storage container and a cooperating waste transfer apparatus and 1 indicates a water closet bowl having a lower end portion $1^a$ which communicates with a trap 2. The trap has a discharge end in communication with a waste discharge conduit 3. A water discharge conduit 4 from the wash basin 5 (Fig. 1) enters the side wall of the trap at its upper portion opposed to its discharge end, at 6 (Fig. 3), immediately below the water intake port at 6 the trap contains within its chamber a wall 7 spaced above the bottom wall of the trap whereby a nozzle chamber 8 is formed immediately under the wall 7. The inward end of the wall 7 is spaced above the bottom of the trap forming a discharge outlet 9 for the chamber 8. This outlet faces in the direction of the discharge end of the trap. A fluid pressure nozzle 10 is entered horizontally in the wall of the chamber 8 and discharges in the direction of the outlet 9 in said chamber. The bottom $1^a$ of the water closet bowl opens into the upper portion of the chamber of the trap spacedly apart from and above the wall 7. The water closet bowl has an upper chamber 11 immediately below its seat and this chamber is in ported communication with the chamber of the under portion $1^a$ of the water closet bowl. This port is closable by a hinged cover 12 which is pivoted at 13 on a pivot rod having a rocker arm 14 the other end of which is connected with an end of the link 15 at 16. The other end of the link is pivoted at 17 to the under end of a bell crank 18 which at its bend is pivoted at 19. The other end of the other arm of the bell crank is pivoted at 20 to the under end of a vertical rod 21 mounted endwise in a vertical bearing 22 supported by a portion of the bowl structure. The rod 21 passes upwardly and is enclosed in a coil spring 23 the under end of which is supported by the bearing and the upper end of which is shown with a head 24. From a rod immediately below its head a bracket 25 projects horizontally. The upper end of the coil spring butts against the under side of this bracket from which a rod 26 extends downwardly and is endwise reciprocable through the car floor $a$. The lower end of the rod is entrant in a casing 27 dependent from the under side of the car floor; the water closet bowl being supported by the floor and the trap being located within the casing. The discharge water conduit from the wash bowl passes downwardly through the floor and passes through a side wall of the casing to make its connection at 6 with the trap. The discharge conduit 3 is partially within the casing and extends outwardly through an end wall thereof.

Within the casing, the under end of the rod 26 is pivoted at 28 to an end of a tiltable bar 29 the mid-length section of which is pivoted at $29^a$ to a control valve stem. The other end of the bar 29 is pivoted at 30 to a bracket 31. The control valve from which said stem projects is indicated by 32. Said nozzle 10 is in communication with the control valve 32 on its discharge side. The control valve 32 on its intake side is in communication with a pressure fluid conduit 33 which is best provided with a shut-off valve 33$^b$ for use whenever desired.

When the head 24 of the actuating rod 21 is pushed downwardly, it opens a valve not shown of a flush water supply; also swings the hinged cover 12 into open position and opens the control valve 32 to permit fluid under pressure to enter into the nozzle 10 for expelling any waste in chamber 8 therefrom into the conduit 3 and thence into the temporary storage container. When the control valve 32 and the shut-off valve 33$^b$ are open, air under compression is supplied to the nozzle either from the air line of the train or from a compressed air container 33$^a$ which may be an element of the compressed air line.

A conduit 34 has its intake end connected with the intake end of the nozzle structure between the control valve 32 and the delivery end of the nozzle and when compressed air flows through the nozzle, compressed air also flows through the conduit 34 into a partial vacuum creating device described below. The temporary storage container 35 is suspended from the under side of the car floor by suitable brackets 36, and when a partial vacuum is created in said partial vacuum creating device, air or gas in the container 35 are rarefied with the result that the waste from the trap is automatically transferred into the container 35 so long as air flows through the nozzle.

As there are ordinarily two water closets in each passenger car, one at one end and the other at the other end thereof, provision is made for connecting each water closet and associated wash basin with a side of the container 35. The conduit 3 from one trap enters one side and the conduit 3 from the other trap enters the other side of the container.

In a system containing this invetnion and which is installed without connection with the main air line, compressed air is supplied to the compressed air tank 33$^a$ and thence to the conduit 33 from an air compressor B operated from an axle driven motor M as indicated in Fig. 1. A car wheel shaft $m$ carries a belt $m^1$ for the driving pulley $m^2$ of the motor M.

From the eduction side of the air compressor B a pipe $m^3$ leads to a conduit $m^4$ which discharges into the compressed air tank 33$^a$: the conduit $m^3$ having another branch pipe $m^5$ if required for communication with another compressed air tank associated with the toilet apparatus at the other end of the car. Whenever desired, driving belt $m^1$ may be put into inoperative position by any suitable mechanical means too well known to require description.

The compressed air tank 33$^a$ is shown provided with a relief valve $m^6$.

The conduit 34 discharges downwardly into a manifold 37 which is a part of the partial vacuum creating apparatus above mentioned.

For the reason that the temporary waste storage container 35 is shown provided, for better understanding of the invention, with two partial vacuum creating devices, one associated with toilet apparatus at one end of the car and the other to be associated with toilet apparatus (not shown) from the other end of the car, the two conduits 34 and 34$^a$ are diagrammatically shown connected by a by-pass pipe $x$ provided with a shut-off valve $x^1$. There is a manifold 37 operatvely connected with each end of the waste storage container.

The bottom of the container 35 is provided with an outlet 38, provided with a stopper device the handle of which is indicated by 39. Except for removal of the contents of the temporary storage container, the stopper device is kept closed. The top of the container is indicated by 40 and is provided between its ends with dependent plates 41 which are spaced apart one from the other and each of which is spaced apart from the adjacent end wall of the container. The ends of these plates are spaced apart from the bottom of the container. These plates restrict the surge of the waste into which they extend and the plates at their upper portions are perforated at 41$^a$ for escape of air and gas from above the waste.

Each end wall of the container 35 in its upper portion is provided with an air port in communication with an intake port 42 of a liquid seal tank 43 secured to an end wall of the casing.

Each liquid seal tank 43 is provided with a dependent partition 44 which extends part way towards the bottom of the tank and dips in the liquid seal $y$ contained in the under portion of the tank.

Each tank is provided at its upper portion with an outlet port 45 which is in communication with a conduit coupling 46, which in turn is in communication with one or the other of the manifolds 37 or 37$^a$.

The compressed air enters the chamber of the manifold through a nozzle 47 in the upper wall of the manifold and travels out of the manifold through an upwardly flared nozzle 47$^a$ into a dependent discharge tube 48 with which each manifold 37 and 37$^a$ is provided. Each discharge tube enters the chamber of a casing 49 carried by a tank 43 and extends nearly to the bottom of the chamber of the casing which is filled with some air filtering material such as mineral wool for example and which is indicated by 51. Each casing 49 is also provided with an air escape tube 52 the under end portion of which passes through the bottom of the casing and the upper end portion of which is exposed within the chamber of the casing.

Air entrant with the waste material through the waste discharge conduit 3 into the chamber of the container 35 passes through the air seal $y$ and out through the port into the coupling 46 and therethrough into a chamber of a manifold and then through a tube 48 and casing 49 and tube 52 to the atmosphere. The filtering material 51 in the casing 49 serves also as a noise muffler.

Compressed air passing through the conduits 34 and 34$^a$ into the chambers of the manifolds, creates a partial vacuum therein with the result that air entrained with the waste deposited in the container 35 is sucked through sealing liquid $w$.

In Fig. 3 there is shown a steam pipe 53 for use in heating the casing 27 to keep the apparatus in the casing from freezing in cold weather. In Fig. 4 a steam pipe 55 is shown with bends in the chamber of the waste storage container to keep the waste from freezing in winter weather. The steam pipes 53 and 55 may be portions of the train heating system.

The described apparatus may be varied in construction and form without departure from the invention. Said trap constitutes one form of waste receiver. The invention may be embodied in railway cars, road vehicles, air craft and the like.

What I claim is:

1. The combination in a man carrying vehicle of a toilet apparatus including a waste receptacle; a temporary waste container; said receptacle and container being in communication one with another; apparatus for automatic transfer of waste from the receptacle into said container; said apparatus comprising a source of compressed air for effecting such transfer; and filtering and noise reducing apparatus operatively connected with the waste storage container.

2. The combination in a man carrying vehicle of a toilet apparatus including a waste receptacle; a temporary waste storage container, said receptacle and container being in communication one with another; and apparatus for automatic transfer of waste from the receptacle into said container; said transfer apparatus communicating with the temporary storage container and also with apparatus for creating a partial vacuum in the temporary storage container; and a fluid control conduit communicating with the partial vacuum creating apparatus for effecting said partial vacuum; a liquid seal tank in communication with said container and also with said partial vacuum creating apparatus; and a filtering and noise reducing tank in communication with the discharge side of said partial vacuum creating tank and having a discharge port open to the atmosphere.

3. The combination in a man carrying vehicle of a plurality of independently operable toilet apparatuses each including a waste receptacle; a temporary waste storage container, each of said receptacles being in communication with said container; and a plurality of independently operable apparatuses for automatic transfer of waste from each receptacle into said container; each of said transfer apparatuses communicating with the temporary storage container and also with an apparatus for creating a partial vacuum in the temporary storage container; a fluid control conduit communicating with each partial vacuum creating apparatus for effecting a said partial vacuum; a plurality of liquid seal tanks each in communication with said container and also with one of said partial vacuum creating apparatuses; and for each liquid seal tank in communication with each partial vacuum apparatus, a filtering and noise reducing tank in communication with the discharge side of its adjacent partial vacuum creating apparatus and having a discharge port open to the atmosphere.

4. In a man carrying vehicle, the combination of a temporary waste storage container located under the vehicle floor and fixedly suspended from the vehicle, said container having an under waste discharge port provided with a closure operable by an attendant; in conduit communication with said temporary storage container, a toilet apparatus provided with a waste receptacle; in conduit connection with a temporary storage container, a liquid seal tank, the upper portions of the chambers of said container and tank being in communication one with the other; a partial vacuum creating apparatus in conduit connection with the upper portion of the liquid seal tank; the partial vacuum creating apparatus being in communicating with the atmosphere; a source of compressed air in conduit connection with a compressed air jet nozzle discharging into the waste receptacle; said nozzle; a control valve for said nozzle, the nozzle being connected, between the control valve and the end of the nozzle discharging into the waste receptacle, with a compressed air conduit in communication with the partial vacuum creating apparatus.

5. In a man carrying vehicle, the combination of a temporary waste storage container located under the vehicle floor and fixedly suspended from the vehicle, said container having an under waste discharge port provided with a closure operable by an attendant; in conduit communication with said temporary storage container, a toilet apparatus provided with a waste receptacle;

in conduit connection with a temporary storage container, a liquid seal tank; the partial vacuum creating apparatus being in communication with the atmosphere; a source of compressed air in conduit connection with a compressed air jet nozzle discharging into the waste receptacle; said nozzle; a control valve for said nozzle, the nozzle being connected, between the control valve and the end of the nozzle discharging into the waste receptacle, with a compressed air conduit in communication with a partial vacuum creating apparatus; an axle-driven motor; an air compressor driven from the motor, the air compressor having its eduction side in communication with a compressed air tank; and said compressed air tank, the compressed air tank being in conduit connection with said control valve.

6. The combination in a man carrying vehicle of a plurality of independently operable toilet apparatuses each including a waste receptacle; a temporary waste storage container, each of said receptacles being in communication with said container; and a plurality of independently operable apparatuses for automatic transfer of waste from each receptacle into said container; each of said transfer apparatuses communicating with the temporary storage container and also with an apparatus for creating a partial vacuum in the temporary storage container; a fluid control conduit communicating with each partial vacuum creating apparatus for effecting said partial vacuum; a plurality of liquid seal stanks each in communication with said container and also with one of said partial vacuum creating apparatuses; and for each liquid seal tank in communication with each partial vacuum apparatus, a filtering and noise reducing tank in communication with the discharge side of its adjacent partial vacuum creating apparatus and having a discharge port open to the atmosphere; an air compressor having its eduction side in conduit connection with one of the vacuum creating apparatuses; and a by-pass pipe in communication with such conduit connection and also in communication with another vacuum creating apparatus.

7. The combination in a man carrying vehicle of a toilet apparatus including a waste receptacle; a temporary waste storage container, said receptacle and container being in communication one with another; and apparatus for automatic transfer of waste from the receptacle into said container; said temporary storage container being in communication with a pair of liquid seal tanks; said pair of liquid seal tanks; each liquid seal tank being in communication with a partial vacuum creating apparatus; a partial vacuum creating apparatus for each liquid seal tank; a source of fluid under pressure in communication with each partial vacuum creating apparatus; said container and also said seal tanks each having a dependent plate, the container plate compelling air admitted to the container with waste to travel through the waste and the seal tank plate compelling air and gases from the temporary waste storage container to travel through a liquid seal.

8. In a man carrying vehicle, the combination with a temporary storage container having in its lower portion an outlet provided with a closing device under the control of an attendant, the container being interiorly provided with a pair of spaced apart, anti-surge plates extending from the upper portion of the container partway to its bottom; a liquid seal tank located at each end of said container, the upper portion of the container chamber and the upper portion of the liquid seal tank being in conduit connection one with the other and each liquid seal tank being provided in its upper portion with a dependent, anti-surge plate extending part way to the bottom of said tank; a vacuum creating apparatus in conduit connection with the upper portion of each liquid seal tank, each vacuum creating apparatus discharging into a filtering and noise muffling apparatus open to the atmosphere.

9. In a man carrying vehicle, the combination of a toilet waste receiver; a temporary storage container in conduit communication with said receiver; apparatus under the control of an operator for blowing waste from the said receiver through said conduit towards the container; and associated apparatus for simultaneously effecting a reduction of gaseous pressure in the container for promotion of travel of the waste from the receiver into the container; and noise muffling means.

10. In a man carrying vehicle, the the combination of a toilet waste receiver; a temporary storage container in conduit communication with said receiver; apparatus under the control of an operator for blowing waste from the said receiver through said conduit towards the container; and associated apparatus for simultaneously effecting a reduction of gaseous pressure in the container for promotion of travel of the waste from the receiver into the container; noise muffling means and a compressed air tank in communication with said apparatus.

11. In a man carrying vehicle, the combination of a toilet waste receiver; a temporary storage container in conduit communication with said receiver; apparatus under the control of an operator for blowing waste from the said receiver through said conduit towards the container; and associated apparatus for simultaneously effecting a reduction of gaseous pressure in the container for promotion of travel of waste from the receiver into the container; noise muffling means and a compressed air tank in communication with said apparatus; and an axle-driven air compressor having its eduction side in communication with the compressed air tank.

12. In a man carrying vehicle, the combination of a toilet apparatus including a trap in conduit connection with a temporary storage waste container; said container; a fluid pressure device discharging into the trap for removal of waste therefrom into the conduit to the container; a valve under control of an operator for control of pressure fluid into said fluid pressure device; and a partial vacuum creating apparatus in operative connection with the container and in conduit connection with said control valve; and noise muffling apparatus in communication with the partial vacuum creating apparatus.

Signed at Scranton, in the county of Lackawanna and State of Pennsylvania, this 9th day of April A. D. 1925.

SAMUEL S. RIEGEL.